W. THOMAS.
PROCESS OF AND APPARATUS FOR DISTILLING COAL AND OTHER MATERIAL.
APPLICATION FILED NOV. 15, 1916. RENEWED OCT. 28, 1920.
1,365,128.
Patented Jan. 11, 1921.
2 SHEETS—SHEET 1.
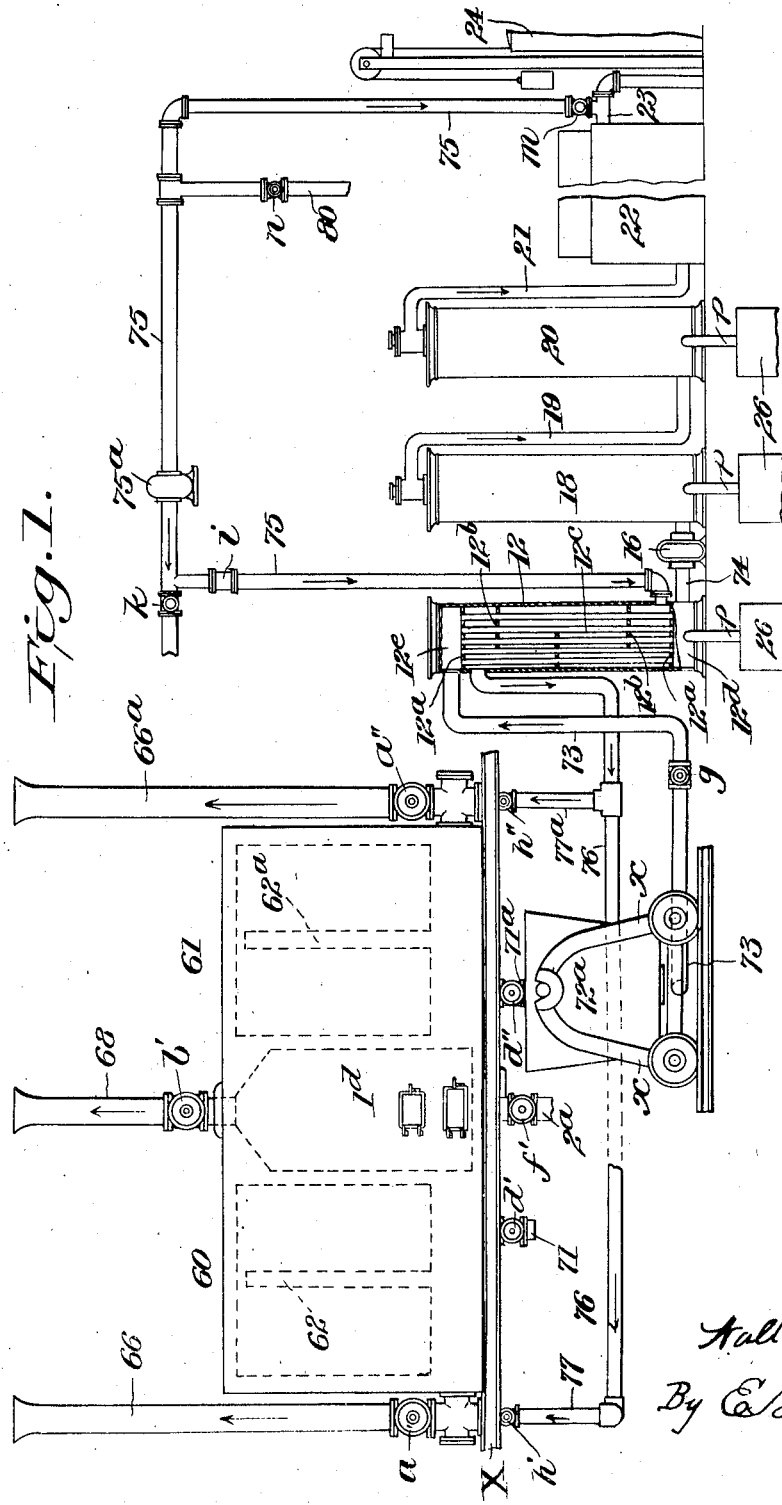

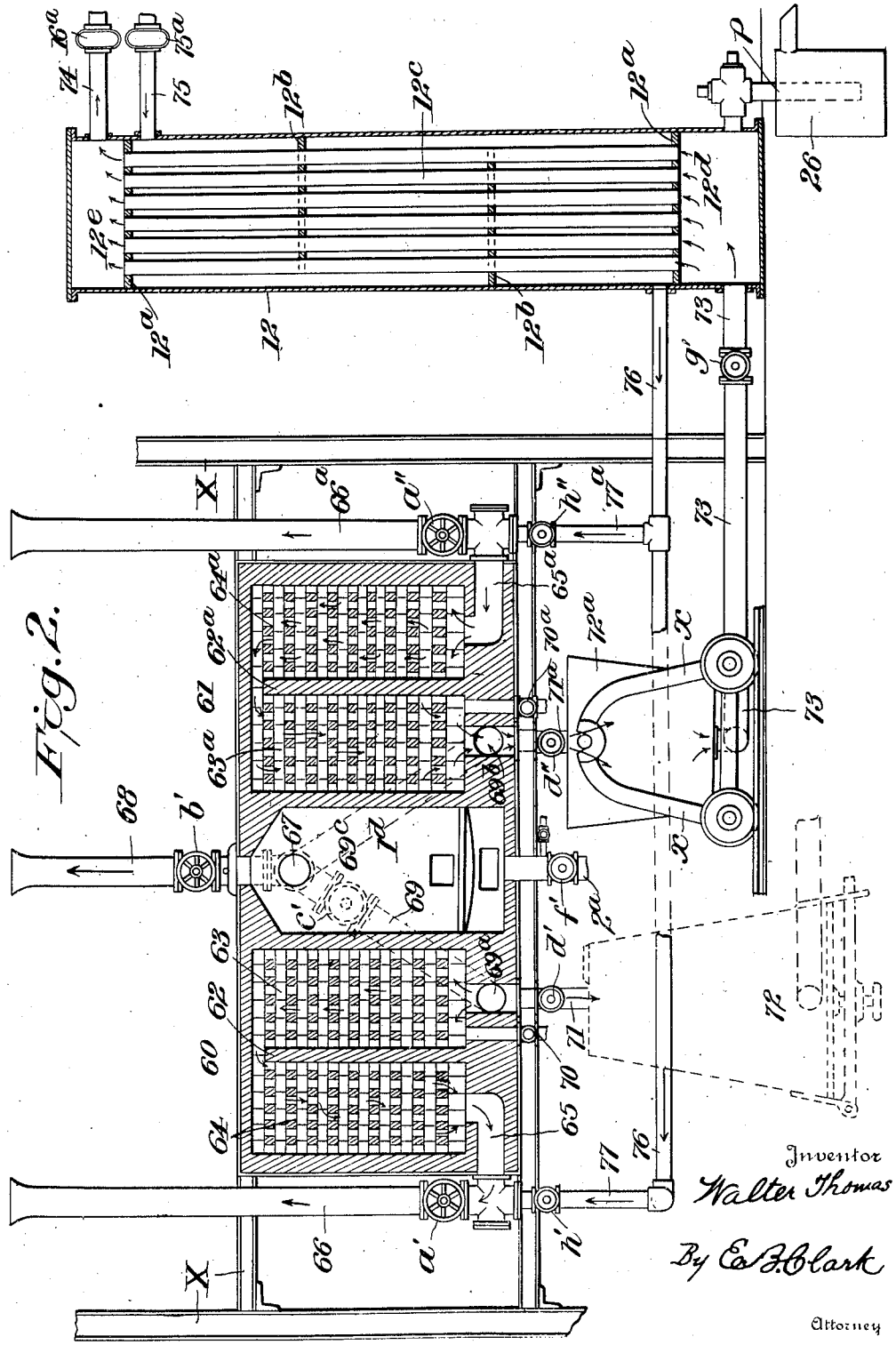

UNITED STATES PATENT OFFICE.

WALTER THOMAS, OF NANAIMO, BRITISH COLUMBIA, CANADA.

PROCESS OF AND APPARATUS FOR DISTILLING COAL AND OTHER MATERIAL.

1,365,128. Specification of Letters Patent. Patented Jan. 11, 1921.

Application filed November 15, 1916, Serial No. 131,482. Renewed October 28, 1920. Serial No. 420,328.

*To all whom it may concern:*

Be it known that I, WALTER THOMAS, a subject of the King of Great Britain, residing at Nanaimo, in the county of Nanaimo, Province of British Columbia, Canada, have invented certain new and useful Improvements in Processes of and Apparatus for Distilling Coal and other Material, of which the following is a specification.

This invention relates to a process and apparatus for distilling coal, wood, shale, peat or lignite, by the direct contact of hot gas with the material for the production of smokeless fuel and valuable by-product liquids used in the manufacture of high explosives, dyes and disinfectants.

The principal object of my invention is to provide for the more rapid and economical distillation of coal and other material containing volatile hydrocarbon matter by direct internal application of hot gas at a constantly controlled temperature, and distributed in contact with the material, for more rapidly taking up and carrying off volatile matter, such as benzol or benzin, toluol and other liquid products containing creosote and carbolic acid, and the like.

Another object is to provide for the rapid and economical production of pure and valuable liquid and solid products by the internal distillation of coal, wood, shale, peat and lignite,—that is, distillation effected by direct contact with the material of hot desulfurized and purified gas, at a perfectly controlled temperature, for the purpose of greatly expediting the operation and producing smokeless fuel free from sulfur and sulfur compounds, and purer higher grade liquid products.

Another object is to provide for rapidly liberating gas and vapor from coal, wood and other materials containing a large per cent. of volatile products, condensing and collecting the hydrocarbons, such as benzol, toluol and creosote liquids, washing, scrubbing and purifying the gas to remove ammonia and sulfur compounds, and then returning the cool purified gas and using it, first for cooling the hot distilled gaseous products, causing condensation of volatile products into pure liquids, and then further heating such gas in contact with hot brick work in regenerator chambers, to the desired temperature and then distributing it at a controlled and uniform temperature through and in direct contact with a body of material undergoing distillation.

In carrying out my process hot, purified gas, at a controlled temperature, will be passed into intimate contact with every particle or molecule of coal and rapidly pick up the volatile matter at a temperature, between 1000° and 1500° F. Practically all of the volatile matter will be carried off with the currents of hot gas and practically none of such matter, or any tarry matter will be baked into hard carbon or crusts on the walls of the retort or distilling chamber. The yield of benzol and toluol in pure condition—useful in making coal tar dyes—will be increased; also the yield of creosote-oil and carbolic acid—used in making high explosives—will be greatly increased, and a high grade smokeless fuel, practically free from sulfur and its compounds, will be produced.

Owing to the fact that, in my process, direct internal distillation is effected by contact of hot desulfurized and purified gas at a constantly maintained and controlled temperature there will be no injurious and objectionable reactions in the distillation and production of pure and uniform qualities of liquid distillate products, as is the case when coal is distilled in retorts or ovens which are subjected to excessive and irregular external heats in an effort to force the heat to penetrate several inches of fire clay walls and a thick body of quiescent fuel. In my process the operation is rapid, though the temperature is comparatively low, for the reason that the heat is applied directly to every particle or molecule of coal and the distillate products are immediately carried along and out of the distilling chamber by the currents of hot gas. No opportunity is allowed for objectionable reactions in the distillate and no chance of burning and formation of thick tar or hard carbon is permitted.

An important part of my process covers the elimination of sulfur and sulfur compounds from the gas, so that, when it is reheated and passed through the body of coal it will assist in eliminating the sulfur therefrom, producing a fuel which is both smokeless and free from sulfur. Sulfur and its compounds will be removed from the gas by lime or other known agents in a manner well known to gas engineers.

The apparatus being of simple construction and comparatively small first cost is well adapted to be installed and operated in small works where there is a demand for pure coal gas, free from carbon monoxid, and for pure smokeless coal. In these works, providing a supply of gas is available; the operation of distilling coal and generating gas may be started in a short time owing to the fact that hot gas is brought into direct contact with the particles of coal throughout the whole body under treatment; and in about sixty minutes the maximum production per retort may be effected. The engineer is thus enabled to make the required quantity of gas in a few hours and then shut down. This can be done owing to the fact that the operation is rapid and can be carried out at a temperature of about 1200° F.

Another object is to provide an apparatus of improved construction, by means of which cheap producer-gas may be generated and used directly for heating a pair of regenerator chambers, which are alternately heated and used for heating purified gas which is passed in contact with coal or other material for effecting internal distillation.

I will now describe the apparatus and process in detail by reference to the accompanying drawings in which—

Figure 1 represents an elevation partly in section, showing the whole apparatus.

Fig. 2 represents, on enlarged scale, a longitudinal sectional elevation of part of the apparatus.

The preferred form of apparatus for carrying out my process of distilling coal, wood and other material and for heating the purified gas, which is passed hot into direct contact with the material, is shown in the drawings which illustrate a regenerative heating furnace in connection with a movable coal retort and suitable pipe and valve connections. The regenerator-furnace is preferably mounted on an iron frame X, and comprises a central gas producer $1^d$, Fig. 2, and side regenerative chambers 60 and 61, and suitable valved pipe connections. The walls of the chambers are constructed of brick and filled with fire-clay checker brick-work in a well known manner. The chamber 60 is divided by a partition 62 into compartments 63 and 64 communicating by an opening above the partition. The base of compartment 64 has an outlet and inlet flue 65, with which connects a stack pipe 66, having a valve $a'$, and a gas inlet pipe 77, having a valve $h'$. The chamber 61 is constructed like chamber 60, with partition $62^a$, compartments $63^a$, $64^a$ and flue $65^a$ with which connects a stack pipe $66^a$, having a valve $a''$, and a gas inlet pipe $77^a$, having a valve $h''$. The gas producer $1^d$ is preferably constructed centrally in the same casing with the regenerator, and is provided at the top with a gas outlet opening 67, with which connects a stack pipe 68, having a valve $b'$, and a gas outlet pipe 69, having a valve $c'$, leading to the inlet port $69^a$ at the base of the compartment 63. A valved air inlet pipe 70 also connects with a port in the said base. A number of air inlet pipes and ports may be used to supply the necessary volume of air to burn the gas. An air supply pipe $2^a$, having a valve $f'$ and a valved steam pipe $2^b$, connects with the base of the producer, and may lead from a fan or other forcing device. With the passage at port $69^a$ connects a gas discharge pipe 71, having a valve $d'$ and connecting with a stationary distilling retort 72, shown in dotted lines. The base of the regenerator compartment $63^a$ is provided with vertical passages, and a port $69^b$ with which will connect a valved gas pipe $69^c$. A valved air inlet pipe $70^a$ connects with the other vertical passage. A gas pipe $71^a$, having a valve $d''$, connects the passage at port $69^b$ with the top of a movable distilling retort $72^a$. This retort is mounted by trunnions on a wheeled truck $x$. A gas outlet pipe 73, Fig. 2, having a valve $g'$ connects with the base of retort $72^a$ and with the base chamber $12^d$ of the cooler 12. A pipe 74 connects with the upper chamber $12^e$ and with an exhauster $16^a$, and will, in practice connect with the bottom of the second cooler and condenser 18, shown in Fig. 1. A supply pipe 75 for cold gas leads from a force pump $75^a$, Fig. 2 and connects with the upper part of the middle chamber in cooler 12, and an outlet pipe 76 connects with the lower part of said chamber, and has branch pipes 77 and $77^a$, connecting respectively, with the flues 65 and $65^a$, Fig. 2. The inlet and outlet pipes may be coupled to the movable retort $72^a$ in a well known manner. The movable distilling retort $72^a$ may be connected to either of the gas inlet pipes 71 or $71^a$, but a stationary retort 72, shown in dotted lines, indicates that two stationary retorts may be used and connected with the regenerator chambers.

The pipe connections to the cooler 12 in Fig. 2 show a modification of the arrangement shown in Fig. 1, and simply direct the gases in the opposite directions from those described with reference to Fig. 1. The connections in Fig. 2 provide for passing the hot gas from the retort up through the tubes in chamber $12^c$, while in Fig. 1 the connections provide for passing the hot gas from the retort down through said tubes. Referring now to Fig. 1:—Cold gas from a holder or the outlet of the purifier 22 is heated in the first cooler and condenser 12 by the outgoing hot gas from the retort and the cold gas becomes heated. This is a tubular condenser of known construction and has top and bottom tube sheets 12ᵃ, providing upper and lower gas chambers 12ᵉ and 12ᵈ, the sheets being connected by tubes in the larger intermediate chamber 12ᶜ, which is provided with transverse baffle plates 12ᵇ, making a circuitous passage for gas to be heated. The outlet pipe 73 from the distilling retort connects with the upper gas chamber 12ᵉ of the condenser and an outlet pipe 74 connects the lower gas chamber with a positive rotary exhauster 16, which discharges by a pipe into the base of the second cooler and condenser 18. A pipe 19 connects the top of cooler 18 with the bottom of cooler 20, and a pipe 21 connects the top of the latter with the usual lime purifier 22. An outlet pipe 23 leads from purifier 22 into a holder 24. With pipe 23 connects a return pipe 75 having a valve $m$, and serving as the main cold gas supply pipe. In the return pipe 75 I preferably connect a positive gas forcing pump 75ᵃ for increasing the pressure of gas supplied to the coal distilling retort, so that the hot gas may be caused to quickly permeate the body of coal and quickly carry off the products of distillation. A pipe 75, having a valve $i$, leads from pump 75ᵃ to the lower end of the intermediate chamber 12ᶜ, and a pipe 76 and its branches 77 and 77ᵃ having valves connect the top of said chamber with the regenerator chambers 60 and 61, shown in Fig. 2. A valve $k$ is placed in the branch pipe section leading from pipe 75 so that cold gas may be passed to another place of use. A pipe 80 having a valve $n$, connects with pipe 75 and may be used for supplying natural gas, or gas from a separate holder, to be heated and passed into the coal distilling retort. The condensers or coolers 18 and 20 may be washer-scrubbers of well-known construction. With the bottom of each cooler or condenser there is connected by pipe $p$ a tar or liquid trap 26 of a known variety for receiving the condensed liquid products.

In practice gate valves may be used on the larger pipes. The supply pipes may be arranged partially underground, or in any convenient manner, and many modifications may be made in the construction and arrangement of the apparatus. Although I prefer a movable and dumping coal distilling retort for some purposes, yet a stationary retort or chamber, as shown in dotted lines, Fig. 2, may be used, and would be preferable in some plants.

The operation is very simple and may be conducted as follows:—The cold purified gas will be drawn from the holder by pump 75ᵃ, Fig. 2, and forced down around the tubes in chamber 12ᶜ where it will be heated by the hot gas passing out through the tubes, and will be further heated in one of the regenerator chambers, say 60. The gas producer 1ᵈ, being fired, producer gas will be passed off by pipe 69 and burned in compartment 63, the hot products being passed through compartment 64 and thence off by stack pipe 66, the valve $a'$ being open and valve $h'$ closed. Assuming that the chamber 61 has been heated in like manner and the valve in the producer gas supply pipe 69ᶜ closed, valve $a''$ closed and the valve in air pipe 70ᵃ closed, the valve $d''$ in pipe 71ᵃ may be opened. The valve $h''$ may now be opened, admitting desulfurized and purified gas into the regenerator chamber 61 where it will be heated by contact with the brick checker-work. The hot gas will flow thence down through pipe 71ᵃ into the distilling retort 72ᵃ containing a charge of coal or other material, effecting rapid distillation thereof. The resulting rich gas and vapors will be passed off through pipe 73, chamber 12ᵈ and tubes 12ᶜ and thence by pipe 74 to the second cooler 18 shown in Fig. 1. In order to expedite the distilling operation for rapid production of smokeless fuel, the checker-brick may be highly heated, and the purified gas heated to a temperature of 1600° to 1800° F. A sufficient distillation of the coal in retort 72 or 72ᵃ may be thus effected in about one hour. The hydrocarbon vapors will be quickly carried along by the forced current of gas and cooled and condensed in the first cooler 12 before they can be injured by the high temperature. The coal will thus be desulfurized and made smokeless, though it will burn with a clear, bluish white flame and be more easily ignited than commercial hard coke.

In the distillation of coal for generating gas it is well known to gas engineers that the sulfur in the coal is caused to enter into new combinations to form sulfureted hydrogen $H_2S$, carbon bisulfid $CS_2$, and some ammonium sulfid $NH_4HS$ and other compounds. These will pass off as gas. A purified and desulfurized hot gas containing hydrogen passed in contact with the distilling coal will assist the elimination of sulfur by reason of the hydrogen combining with sulfur to form surfureted hydrogen. In this way most of the sulfur is removed from the coal and it may be properly called desulfurized coal, though it may still retain a trace of sulfur. I use the term "desulfurized" herein in the general sense in which ores which have been roasted are said to be desulfurized. In this process the sulfureted hydrogen and carbon bisulfid are removed from the gas by passage through lime (hydrate of lime) in the purifier box 22, so that desulfurized and purified gas is provided for reheating and use in the distilling operation.

It will be understood that, by proper manipulation of the valves one regenerator chamber will be heated up while the other is being used for heating purified gas and that, the currents of gases will be reversed as required for effective operation of the apparatus. When the coal in a movable retort has been distilled the retort will be uncoupled from its connecting pipes and the truck $x$ run off on rails to a storage vault, where the contents will be discharged. An exhauster 16, as shown in Fig. 1, or 16ª as shown in Fig. 2, will be used to draw off all gas before the retort is disconnected from its pipes. All of the operations can be conveniently and quickly performed and superior products produced by my process in this form of apparatus.

Having described my invention, what I claim, and desire to secure by Letters Patent, is—

The process of distilling coal, wood and other material, which consists in first internally heating a regenerating chamber, then heating purified gas by passing it through the heated chamber, then passing such gas through and in contact with a body of the material to be distilled in a separate chamber, passing off from the last chamber the resulting vaporous product with the hot gas, passing the same in contact with one surface of a double surface condenser, at the same time passing the cooled and purified gas in contact with the other surface of said condenser, thereby cooling and condensing the hot gas and vapors and preheating the cold gas, further heating the preheated purified gas by passing it through said regenerator chamber, and then passing it into the body of material being distilled.

In testimony whereof I affix my signature in presence of two witnesses.

WALTER THOMAS.

Witnesses:
Ino Shaw,
Geo. W. Johnson.